United States Patent
Otsuka et al.

(10) Patent No.: US 9,296,849 B2
(45) Date of Patent: Mar. 29, 2016

(54) POLYCHLOROPRENE LATEX, POLYCHLOROPRENE LATEX COMPOSITION, AND MOLDED ARTICLE

(71) Applicant: DENKI KAGAKU KOGYO KABUSHIKI KAISHA, Tokyo (JP)

(72) Inventors: Hidehito Otsuka, Itoigawa (JP); Kiyoshi Sunada, Itoigawa (JP); Kenji Mochizuki, Itoigawa (JP); Toru Shiraiwa, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/382,478

(22) PCT Filed: Mar. 1, 2013

(86) PCT No.: PCT/JP2013/055755
§ 371 (c)(1),
(2) Date: Sep. 2, 2014

(87) PCT Pub. No.: WO2013/129676
PCT Pub. Date: Sep. 6, 2013

(65) Prior Publication Data
US 2015/0152209 A1 Jun. 4, 2015

(30) Foreign Application Priority Data
Mar. 2, 2012 (JP) ................. 2012-046073

(51) Int. Cl.
| | |
|---|---|
| C08F 236/18 | (2006.01) |
| C08L 11/02 | (2006.01) |
| C08C 1/15 | (2006.01) |
| C08F 36/18 | (2006.01) |
| C08F 136/18 | (2006.01) |

(52) U.S. Cl.
CPC ............. *C08F 236/18* (2013.01); *C08C 1/15* (2013.01); *C08F 36/18* (2013.01); *C08F 136/18* (2013.01); *C08L 11/02* (2013.01)

(58) Field of Classification Search
CPC .................................... C08F 236/18
USPC .......................................... 524/273
See application file for complete search history.

(56) References Cited

U.S. PATENT DOCUMENTS

| | | | |
|---|---|---|---|
| 2012/0108744 A1 | 5/2012 | Hashimoto et al. | 524/747 |
| 2013/0337573 A1* | 12/2013 | Sunada et al. | 436/125 |

FOREIGN PATENT DOCUMENTS

| | | |
|---|---|---|
| EP | 1 574 532 A1 | 9/2005 |
| EP | 2 452 973 A1 | 5/2012 |
| JP | 2001-049043 A | 2/2001 |
| JP | 2005-008859 A | 1/2005 |
| JP | 2007-106994 A | 4/2007 |
| JP | 2009-215418 A | 9/2009 |
| JP | 2009-215419 A | 9/2009 |
| JP | 2010-1388 A | 1/2010 |
| JP | 2010-106072 A | 5/2010 |
| JP | 2010-106073 A | 5/2010 |
| JP | 2010-126586 A | 6/2010 |
| JP | 2010-150420 A | 7/2010 |
| JP | 2011-122141 A | 6/2011 |
| WO | WO 2011/004805 A1 | 1/2011 |

OTHER PUBLICATIONS

International Search Report mailed May 28, 2013, issued to International Application No. PCT/JP2013/055755.
Extended European Search Report dated Sep. 4, 2015, issued to European Application No. 13755519.9.

* cited by examiner

*Primary Examiner* — Doris Lee
(74) *Attorney, Agent, or Firm* — Stein IP, LLC

(57) ABSTRACT

An object of the present invention is to provide a polychloroprene latex with improved rubber coagulability that gives a film superior in strength by dip molding, a polychloroprene latex composition, and a molded article. The polychloroprene latex is prepared by polymerization of 2-chloro-1,3-butadiene alone or by polymerization of raw monomers at least containing 2-chloro-1,3-butadiene and 2,3-dichloro 1,3-butadiene and has a precipitation rate of 5 to 40%, as calculated according to Equation (I). In Equation (I), A is the mass (g) of the dry product, which is obtained by adding 50 ml of saturated aqueous solution of calcium hydroxide at 23° C. to 50 g of a latex having a solid matter concentration adjusted to 45 to 65 mass % at a liquid temperature of 23° C. over 2 minutes, filtering and collecting the generated precipitate with a 80-mesh wire mesh, and drying the precipitate at 110° C. for 3 hours; B is the mass of the latex before the dropwise addition (50 g); and C is the solid matter concentration (mass %) of the latex before the dropwise addition.

$$\text{Precipitation rate}(\%) = \frac{A}{B \times \frac{C}{100}} \times 100 \qquad (I)$$

18 Claims, No Drawings

POLYCHLOROPRENE LATEX, POLYCHLOROPRENE LATEX COMPOSITION, AND MOLDED ARTICLE

CROSS-REFERENCE TO RELATED APPLICATIONS

This application is a national stage of International Application No. PCT/JP2013/055755, filed Mar. 1, 2013, which claims the benefit of Japanese Application No. 2012-046073, filed Mar. 2, 2012, in the Japanese Patent Office. All disclosures of the document(s) named above are incorporated herein by reference.

BACKGROUND OF THE INVENTION

1. Field of the Invention

The present invention relates to a polychloroprene latex, a polychloroprene latex composition, and a molded article. More specifically, it relates to a polychloroprene latex for use in dip molding, a composition containing the latex and various additives, and an article dip-molded therefrom.

2. Description of the Related Art

Polychloroprene latexes, which are superior in many properties including mechanical strength, weather resistance, heat resistance, and chemical resistance, have been used in various fields including dip-molded articles, textile-processing agents, paper-coating agents, adhesive agents, bonding agents, elastic asphalts (modified asphalts), and elasticity cements. In particular in the field of dip-molded articles, polychloroprene latexes have been used as a primary raw material for various gloves including household, industrial and surgical gloves.

Generally a method, so-called coagulant solution method, has been used in dip molding. In the coagulant solution method, a 3D-shaped dip-molding ceramic or metal mold carrying a coagulant solution having an action to coagulate polychloroprene latex coated on the surface thereof is dipped into and withdrawn from a polychloroprene latex composition containing sulfur, vulcanization accelerators, and others, to give a film coated on the surface. Separation of the film obtained from the dip-molding mold gives a product in a particular shape.

In the coagulant solution method, in order to form a uniform and smooth film on the surface of the dip-molding mold, it is needed to increase the coagulability of the polychloroprene latex by the coagulant. It is known that the amount of the emulsifier used in the polychloroprene latex is preferably lowered as much as possible to improve the coagulability thereof. However, reduction of the emulsifier content may leads to deterioration in anti-freezing stability of the polychloroprene latex, making it impossible to use the latex as the raw material in dip molding because of increased viscosity and freezing.

For the reasons above, there exists a demand for a method of increasing the coagulability of the polychloroprene latex used in dip molding, while preserving the anti-freezing stability thereof. Thus, addition of some emulsifiers to the polychloroprene latex was studied for improvement of the anti-freezing stability. For example, proposed was a method of producing a polychloroprene latex superior in freezing resistance and anti-freezing stability by adding a rosin acid and a polyoxyalkylene alkyl ether having an HLB (Hydrophile-Lipophile Balance) of 10 to 17 (see Patent Document 1).

Also proposed was a method of adding an alkali metal carboxylate salt and a nonionic emulsifier having a polyoxyalkylene structure containing branched alkyl chains having 9 to 16 carbon atoms and having an HLB of 9 to 16 (see Patent Documents 2 and 3). The method of producing a chloroprene latex described in Patent Documents 2 and 3 gives a polychloroprene latex that is not frozen even at −3 to −7° C. Also proposed was a method of producing a polychloroprene latex superior in chemical and mechanical stabilities by emulsion polymerization of chloroprene monomers in the presence of a polyoxyethylene alkyl ether having an HLB of 14 to 19 and a polyvinyl alcohol (see Patent Document 4).

CITATION LIST

Patent Literatures

[Patent Document 1] JP-A No. 2001-049043
[Patent Document 2] JP-A No. 2009-215418
[Patent Document 3] JP-A No. 2009-215419
[Patent Document 4] JP-A No. 2005-008859

SUMMARY OF THE INVENTION

Technical Problem

However, the conventional polychloroprene latexes described in Patent Documents 1 to 4 above have an disadvantage that, when a thin irregular-surfaced dip-molded articles such as glove is prepared, the film is not strong enough, giving a dip-molded article containing molding defects such as pinholes and cracks.

Accordingly, a major object of the present invention is to provide a polychloroprene latex and a polychloroprene latex composition with improved rubber coagulability that gives a film superior in strength by dip molding and a molded article prepared therefrom.

Solution to Problem

The polychloroprene latex according to the present invention is a polychloroprene latex obtained by polymerization of 2-chloro-1,3-butadiene alone or polymerization of raw monomers at least containing 2-chloro-1,3-butadiene and 2,3-dichloro1,3-butadiene, having a precipitation rate of 5 to 40%, as determined by adjusting the polychloroprene latex to a solid matter concentration of 45 to 65 mass % at a liquid temperature of 23° C., precipitating the homopolymer or the copolymer in the adjusted polychloroprene latex by coagulation, as 50 ml of saturated aqueous solution of calcium hydroxide at 23° C. is added dropwise to 50 g of the adjusted polychloroprene latex over 2 minutes, collecting the precipitate as filter cake by filtering the polychloroprene latex containing the precipitate through a 80 mesh wire mesh, determining the mass of the dry product obtained by drying the collected precipitate at 110° C. for 3 hours as A (g), the mass of the polychloroprene latex before addition of calcium hydroxide as B (g), and the solid matter concentration of the polychloroprene latex before dropwise addition of calcium hydroxide as C (mass %), and calculating it according to the following equation (I):

$$\text{Precipitation rate}(\%) = \frac{A}{B \times \frac{C}{100}} \times 100 \qquad [\text{Equation 1}]$$

The content of 2,3-dichloro-1,3-butadiene in the raw monomers may be 1 to 30 mass %.

The polychloroprene latex according to the present invention may contain a nonionic emulsifier in an amount of 0.7 parts or less by mass in 100 parts by mass of the solid matter.

The polychloroprene latex according to the present invention may contain a rosin acid and its alkali-metal salts in a total amount of 3.0 to 5.0 parts by mass and an anionic emulsification assistant (excluding rosin acid-derived product) in an amount of 0.1 to 1.0 part by mass, in 100 parts by mass of the solid matter.

The polychloroprene latex according to the present invention may contain potassium ions in an amount of 0.5 to 1.5 parts by mass and sodium ions in an amount of 0.1 to 0.4 parts by mass in 100 parts by mass of the solid matter.

The polychloroprene latex composition according to the present invention contains the polychloroprene latex described above as solid matter in an amount of 100 parts by mass, a metal oxide in an amount of 1 to 10 parts by mass, an antioxidant in an amount of 0.1 to 5 parts by mass and a surfactant in an amount of 0.1 to 10 parts by mass.

The polychloroprene latex composition may contain additionally sulfur in an amount of 0.1 to 3 parts by mass.

The molded article according to the present invention is a product prepared by dip-molding of the polychloroprene latex or the polychloroprene latex composition described above.

Advantageous Effects of Invention

It is possible according to the present invention to obtain a film superior in strength by dip molding, as the chloroprene latex shows improved rubber coagulability.

Additional aspects and/or advantages of the invention will be set forth in part in the description which follows and, in part, will be obvious from the description, or may be learned by practice of the invention.

DETAILED DESCRIPTION OF THE EMBODIMENTS

Hereinafter, favorable embodiments of the present invention will be described in detail.

(First Embodiment)

First, a polychloroprene latex in the first embodiment of the present invention will be described. The polychloroprene latex in the present embodiment is an aqueous dispersion of a homopolymer of 2-chloro-1,3-butadiene (hereinafter, referred to as chloroprene) or a copolymer prepared by polymerizing raw monomers at least containing chloroprene and 2,3-dichloro-1,3-butadiene. The polychloroprene latex in the present embodiment has a precipitation rate of 5 to 40%, which is the percentage of the precipitate formed under a particular condition when an aqueous calcium hydroxide solution is added dropwise.

[Precipitation Rate: 5 to 40%]

The inventors had earlier proposed, as a method of determining the coagulability of polychloroprene latex, a method of evaluating chemical stability by adding an aqueous calcium hydroxide or calcium nitrate solution at a particular concentration to a polychloroprene latex at a particular concentration (WO 2012/1211135). Alternatively, JP-A No. 2012-219204 proposes a polychloroprene latex superior in chemical stability, as evaluated by the method.

In the case of the polychloroprene latex in the present embodiment, the precipitation rate determined by this chemical stability-evaluating method is used. The precipitation rate of the polychloroprene latex can be determined by the following procedure:

First, a sample of the polychloroprene latex to be tested is prepared at a solid matter concentration of 45 to 65 mass % at a liquid temperature adjusted to 23° C. Then, 50 ml of saturated aqueous solution of calcium hydroxide at 23° C. is added dropwise to 50 g of the latex sample over 2 minutes, making the (co)polymer in the latex sample aggregate and forming precipitate (precipitation step). After the precipitation step, the precipitate-containing latex sample is filtered through a 80-mesh wire mesh, making the precipitated recovered on the wire mesh (recovery step). The recovered precipitate is then dried at 110° C. for 3 hours, to give a dry product (drying step).

When the mass of the dry product is expressed by A (g), the mass of the latex sample used in the precipitation step by B (=50 g) and the solid matter concentration of the latex sample used in the precipitation step by C (mass %), the precipitation rate (%) is calculated from the following equation 2. Here, the solid matter concentration C is within the range used in actual dip molding.

$$\text{Precipitation rate}(\%) = \frac{A}{B \times \frac{C}{100}} \times 100 \qquad \text{[Equation 2]}$$

The precipitation rate described above is an indicator of the moldability of the polychloroprene latex when it is used as the material for dip molding and also of the strength of the molded film obtained by the dip molding. A polychloroprene latex having a precipitation rate of less than 5% does not give a molded article with uniform thickness, as the film obtained after dip molding is thinner, leading to application failure, and generating precipitation irregularity. Alternatively, a polychloroprene latex having a precipitation rate of more than 40% does not permit dip molding, as it becomes more viscous and easily frozen in low-temperature environments.

Thus, the polychloroprene latex in the present embodiment has a precipitation rate of 5 to 40%, as calculated from equation 2. The precipitation rate is preferably 5 to 20%, and more preferably 10 to 15%, for improvement of the anti-freezing stability of the polychloroprene latex.

The precipitation rate can be adjusted, for example by modifying the kinds and the blending rates of the nonionic emulsifiers and the anionic emulsification assistants contained in the polychloroprene latex. The precipitation rate can also be adjusted by modifying the amounts of potassium and sodium ions present in the polychloroprene latex.

[Polychloroprene Latex]

The polychloroprene latex in the present embodiment is prepared by polymerizing chloroprene alone, copolymerizing chloroprene and 2,3-dichloro1,3-butadiene, or copolymerizing chloroprene, 2,3-dichlorol,3-butadiene and monomers copolymerizable with these monomers.

The raw monomers preferably contain 2,3-dichloro-1,3-butadiene in an amount of 1 to 30 mass % for regulation of the properties, such as flexibility, of the dip-molded article. When the raw monomers have a 2,3-dichloro-1,3-butadiene content of less than 1 mass %, it may not be possible to obtain such an advantageous effect of improving flexibility of the dip-molded article. Alternatively when the raw monomers have a 2,3-dichloro-1,3-butadiene content of more than 30 mass %, the monomers may give an excessively crystallized polymer, thus giving a molded article with low flexibility. The 2,3-dichloro-1,3-butadiene content in the raw monomers is more preferably 5 to 20 mass % for improvement of the crystallization resistance.

Examples of the other monomers copolymerizable with chloroprene and 2,3-dichloro-1,3-butadiene for use include acrylic esters such as methyl acrylate, butyl acrylate, and 2-ethylhexyl acrylate; methacrylic esters such as methyl methacrylate, butyl methacrylate, and 2-ethylhexyl methacrylate; hydroxy(meth)acrylates such as 2-hydroxyethyl (meth)acrylate, 2-hydroxymethyl(meth)acrylate, and 2-hydroxypropyl(meth)acrylate;

1-chlorobutadiene, butadiene, isoprene, ethylene, styrene, acrylonitrile, and the like.

These monomers may be used alone or in combination of two or more.

When monomers other than chloroprene and 2,3-dichloro-1,3-butadiene are used, the total content of the monomers (including 2,3-dichloro-1,3-butadiene) other than chloroprene in the raw monomers is preferably adjusted to 1 to 30 mass % and more preferably to 5 to 20 mass %, for improvement of the flexibility of the dip-molded article and also of the properties such as weather resistance, heat resistance, and chemical resistance of the chloroprene copolymer.

[Nonionic Emulsifier: 0.7 Parts by Mass or Less in 100 Parts by Mass of Solid Matter]

In preparing the polychloroprene latex in the present embodiment, a nonionic emulsifier may be used additionally as its emulsifier. In this case, the addition amount thereof is preferably adjusted in such a manner that the amount of the nonionic emulsifier contained in the polychloroprene latex obtained becomes 0.7 parts by mass or less in 100 parts by mass of the solid matter. It is possible in this way to prevent deterioration in rubber coagulability of the polychloroprene latex.

Examples of the nonionic emulsifiers for use include alkyl allylsulfonic acids, polyoxyethylene phenyl ethers, polyoxyalkylene alkyl ethers, polyoxyethylene alkylene alkyl ethers, polyoxyethylene styrenated phenyl ethers, polyoxyethylene distyrenated phenyl ethers, polyoxyethylene tribenzylphenyl ethers, polyoxyethylene polyoxypropylene glycols, polyoxyalkylene alkenyl ethers, sorbitan fatty acid esters, polyoxyethylene sorbitan fatty acid esters, and the like.

[Rosin Acid and its Alkali-Metal Salts: Totally 3.0 to 5.0 Parts by Mass in 100 Parts by Mass of Solid Matter]

A rosin acid and its alkali-metal salts are added as emulsifiers when the polychloroprene latex is prepared. Potassium salt of a disproportionated rosin acid is preferably used in the chloroprene latex in the present embodiment, for regulation of the amounts of sodium and potassium ions described below.

The total amount of the rosin acid and its alkali-metal salts in the polychloroprene latex is preferably 3.0 to 5.0 parts by mass in 100 parts by mass of the solid matter. Regulation of the addition amount of the rosin acid and its alkali-metal salts in such a way that the content thereof in the polychloroprene latex becomes in the range above leads to stabilization of the emulsion polymerization and also to improvement in strength of the film obtained by dip-molding the polychloroprene latex.

[Anionic Emulsification Assistant: 0.1 to 1.0 Part by Mass in 100 Parts by Mass of Solid Matter]

It is possible to reduce the precipitation rate of the polychloroprene latex obtained and improve the anti-freezing stability by using the rosin acid described above and its alkali-metal salts and the anionic emulsification assistant together in preparation of the polychloroprene latex. The "anionic emulsification assistants," as used herein, does not contain any rosin acid-derived product.

The amount of the anionic emulsification assistant (excluding rosin acid derivatives) contained in the polychloroprene latex obtained is preferably 0.1 to 1.0 part by mass in 100 parts by mass of the polychloroprene latex solid matter. Regulation of the addition amount of the anionic emulsification assistant in such a manner that the content thereof in the polychloroprene latex becomes within the range above leads to stabilization of the emulsion polymerization and also to improvement in strength of the film obtained by dip-molding the polychloroprene latex obtained.

Addition of an excessive amount of the anionic emulsification assistant may lead to deterioration in the film-forming efficiency by dip molding and thus to deterioration in strength of the film obtained. Alternatively when the addition amount of the anionic emulsification assistant is excessively small, it is not possible to obtain its favorable addition effect. However, the anionic emulsification assistant is added arbitrarily and may not be added.

Anionic emulsification assistants include carboxylate-, sulfonate-, sulfate ester-, and phosphate ester-type products. Typical examples of the carboxylate-type anionic emulsification assistants include fatty monocarboxylate salts, polyoxyethylene alkyl ether carboxylate salts, n-acylsarcosine salts, n-acylglutamate salts, and the like.

Typical examples of the sulfonate-type anionic emulsification assistants include alkyl allylsulfonic acids, dialkyl sulfosuccinate salts, alkanesulfonate salts, α-olefinsulfonate salts, straight-chain alkylbenzenesulfonate salts, alkyl (branched-type)benzenesulfonate salts, formaldehyde naphthalen anti-freezing stabilizers esulfonate salt condensates, alkylnaphthalenesulfonate salts, n-methyl-n-acyltaurine salts, and the like. Typical examples of the sulfate ester-type anionic emulsification assistants include alkyl sulfate ester salts, alcohol ethoxysulfates, oil and fat sulfate ester salts, and the like.

Typical examples of the phosphate ester-type anionic emulsification assistants include alkylphosphate salts, polyoxyethylene alkyl ether phosphate salts, polyoxyethylene alkylphenyl ether phosphate salts, and the like. Alternatively, a sorbitan fatty acid ester, a polyoxyethylene sorbitan fatty acid ester, or the like may be used as the anionic emulsification assistant. The anionic emulsifier for use is preferably the common sodium salt.

[Potassium Ion: 0.5 to 1.5 Parts by Mass, Sodium Ion: 0.1 to 0.4 Parts by Mass]

The polychloroprene latex in the present embodiment preferably has a potassium ion content of 0.5 to 1.5 parts by mass in 100 parts by mass of the solid matter and a sodium ion content of 0.1 to 0.4 parts by mass in 100 parts by mass of the solid matter. It is possible to improve the anti-freezing stability and the mechanical stability of the polychloroprene latex by regulating the contents of potassium and sodium ions contained therein within the ranges above.

For improvement of anti-freezing stability, the potassium ion content is preferably 0.5 to 1.0 part by mass in 100 parts by mass of the solid matter, while the sodium ion content is preferably 0.1 to 0.2 parts by mass in 100 parts by mass of the solid matter.

The contents of potassium and sodium ions in the polychloroprene latex can be determined, for example, by acid-decomposing the polychloroprene latex with nitric acid and measuring it by inductively coupled plasma-atomic emission spectrometer (ICP-AES). In regulating the contents of the potassium and sodium ions in the polychloroprene latex, it is possible to select the kinds of the reducing agent and the buffering salt used for promotion of polymerization. For example, for addition of potassium ions to the polychloroprene latex, potassium salts such as potassium pyrosulfite, potassium sulfite, potassium hydrogen sulfite, potassium phosphate, or potassium hydrogen phosphate may be used as the reducing agent or the buffering salt.

[Production Method]

Hereinafter, the method of producing the chloroprene latex in the present embodiment will be described. In producing the chloroprene latex in the present embodiment, raw monomers are polymerized by a polymerization method such as emulsion polymerization, solution polymerization, suspension polymerization, or bulk polymerization. Among the polymerization methods above, emulsion polymerization is favorable, as it has various advantages that it is easier to control, the polymer can be isolated easily from the solution after polymerization, and the polymerization rate is relatively higher.

Emulsion polymerization is one kind of radical polymerization, in which raw monomers are polymerized in the presence of water, an emulsifier, an emulsification assistant, a chain-transfer agent, a polymerization initiator, and others, as they are contained in a reactor. The emulsifier for use then may be a rosin acid and its alkali-metal salts as described above. It may be used in combination with a nonionic emulsifier. In addition, the anionic emulsification assistant described above may be used in combination as the emulsification assistant.

The chain-transfer agent for use may be any agent commonly used for emulsion polymerization of chloroprene. Typical examples of the chain-transfer agents include long-chain alkylmercaptans such as n-dodecylmercaptan and tert-dodecylmercaptan; dialkylxanthogen disulfides such as diisopropylxanthogen disulfide and diethylxanthogen disulfide; iodoform and the like.

The polymerization initiator for use may be an organic peroxide such as potassium persulfate, ammonium persulfate, sodium persulfate, hydrogen peroxide, or benzoyl peroxide.

The polymerization temperature is not particularly limited, but the polymerization is preferably carried out at a temperature in the range of 25 to 55° C., more preferably in the range of 30 to 50° C., to ensure stabilization of the flexibility of the chloroprene polymer or copolymer over time.

The polymerization conversion rate of raw monomers is preferably 80 to 95% and more preferably 85 to 95%. A polymerization conversion rate of less than 80% may lead to decrease in the amount of solid matter of the polychloroprene latex and thus to deterioration in productivity. Alternatively, a polymerization conversion rate of more than 95% may lead to elongation of the polymerization period, i.e., deterioration in productivity, and also to deterioration in mechanical strength and rigidity of the dip-molded article obtained.

The terminator added to terminate polymerization before the polymerization conversion rate of raw monomers reaches 100% is, for example, thiodiphenylamine, 4-tert-butylcatechol, 2,2'-methylene-bis(4-methyl-6-tert-butylphenol), diethyl hydroxylamine, or the like.

Various substances such as pH adjusters, anti-freezing stabilizers, emulsion stabilizers, viscosity improvers, antioxidants, and antiseptics can be added after polymerization arbitrarily to the polychloroprene latex in the present embodiment in amounts in the ranges that do not impair the advantageous effects of the present invention.

As described above in detail, the polychloroprene latex in the present embodiment, which has a precipitation rate in the range of 5 to 40%, has an improved rubber coagulability and gives a film superior in strength by dip molding.

(Second Embodiment)

Hereinafter, the polychloroprene latex composition in the second embodiment of the present invention will be described. The polychloroprene latex in the first embodiment described above may be used, as it is, as the raw material for dip-molded articles, but it can also be used in a rubber composition together with various additives added.

Specifically, the polychloroprene latex composition in the present embodiment contains 100 parts by mass of the polychloroprene latex of the first embodiment as solid matter, 1 to 10 parts by mass of a metal oxide, 0.1 to 5 parts by mass of an antioxidant, and 0.1 to 10 parts by mass of a surfactant. The composition, which contains no sulfur or a vulcanization accelerator, does not cause allergic reactions in the glove users.

[Metal Oxide: 1 to 10 Parts by Mass in 100 Parts by Mass of Solid Matter]

The metal oxide is added to improve basic properties, such as tensile strength and modulus, of the molded article obtained by dip-molding the polychloroprene latex composition. The metal oxides for use include zinc oxide, lead oxide, trilead tetraoxide, and the like and these compounds may be used alone or in combination of two or more, as needed.

When the blending amount of the metal oxide is less than 1 part by mass in 100 parts by mass of the solid matter, crosslinking proceeds insufficiently, giving a molded article with insufficient basic properties, such as tensile strength and modulus. Alternatively when the blending amount of the metal oxide is more than 10 parts by mass in 100 parts by mass of the solid matter, the molded article has an excessively high modulus, possibly providing a tough touch feeling, for example when it is converted to gloves. Accordingly, the blending amount of the metal oxide is 1 to 10 parts by mass with respect to 100 parts by mass of the solid matter in the polychloroprene latex.

[Antioxidant: 0.1 to 5 Parts by Mass in 100 Parts by Mass of Solid Matter]

The antioxidant is a compound added to the molded article obtained by dip molding of the polychloroprene latex composition to make it heat-resistant. Such antioxidants include antioxidants for providing heat resistance (heat-resistant antioxidants) and those for providing ozone resistance (ozone-resistant antioxidants) and combined use of them is preferable.

Typical examples of the heat-resistant antioxidants include diphenylamine-based compounds such as octylated diphenylamines, p-(p-toluene-sulfonylamido)diphenylamine, and 4,4'-bis($\alpha,\alpha$-dimethylbenzyl)diphenylamine. Typical examples of the ozone-resistant antioxidants include N,N'-diphenyl-p-phenylenediamine (DPPD) and N-isopropyl-N'-phenyl-p-phenylenediamine (IPPD). Hindered phenol-based antioxidants are preferable for medical gloves that demand favorable appearance, particularly in color tone, and higher hygienic quality.

When the blending amount of the antioxidant is less than 0.1 parts by mass in 100 parts by mass of the solid matter, it is not possible to obtain sufficiently high antioxidant effect. Alternatively when the blending amount of the antioxidant is more than 5 parts by mass in 100 parts by mass of solid matter, vulcanization may be inhibited or the color tone may be deteriorated. Accordingly, the blending amount of the antioxidant is 0.1 to 5 parts by mass in 100 parts by mass of the solid matter in the polychloroprene latex.

[Surfactant: 0.1 to 10 Parts by Mass in 100 Parts by Mass of Solid Matter]

The surfactant is added to improve the storage stability of the polychloroprene latex composition. Typical examples of the surfactants include sodium alkylsulfates, sodium alkylbenzenesulfonates, formaldehyde sodium naphthalenesulfonate condensates, rosin acid soaps, fatty acid soaps, and the like.

When the blending amount of the surfactant is less than 0.1 parts by mass, the colloidal stability is not assured, prohibiting improvement of storage stability. Alternatively when the blending amount of the surfactant is more than 10 parts by mass, the molded article obtained by dip-molding the polychloroprene latex composition may have defects such as bubbles and pinholes more easily. Accordingly, the blending amount of the surfactant is 0.1 to 10 parts by mass in 100 parts by mass of the solid matter in the polychloroprene latex.

[Sulfur: 0.1 to 3 Parts by Mass in 100 Parts by Mass of Solid Matter]

The polychloroprene latex composition in the present embodiment may contain sulfur, as it is blended therein, if measures to allergic reactions are not particularly important. The sulfur added permits accelerated hardening of the polychloroprene latex.

The blending amount of sulfur is preferably 0.1 to 3 parts by mass in 100 parts by mass of the solid matter in the polychloroprene latex. When the sulfur blending amount is less than 0.1 parts by mass in 100 parts by mass of the solid matter, it is not possible to obtain the vulcanization-accelerating effect. Alternatively when the sulfur blending amount is more than 3 parts by mass in 100 parts by mass of the solid matter, the vulcanization may be accelerated excessively, easily leading to scorching and making the vulcanization less controllable, and the film obtained shows deterioration in heat resistance after vulcanization and becomes less attractive in appearance because of bleeding.

The polychloroprene latex composition in the present embodiment may contain, as needed in addition to the additives described above, other additives such as vulcanization accelerators, pH adjusters, fillers, plasticizers, pigments, colorants, wetting agents, and antifoams.

Additives such as metal oxides and antioxidants that are insoluble in water or that instabilize the colloidal state of the polychloroprene latex are preferably added to the polychloroprene latex, as they are previously dispersed in water.

As described above in detail, the polychloroprene latex composition in the present embodiment, which utilizes the polychloroprene latex of the first embodiment described above, is superior in rubber coagulability and gives a film higher in strength than traditional films when it is dip-molded.

(Third Embodiment)

Hereinafter, the molded article in the third embodiment of the present invention will be described. The molded article in the present embodiment is a product obtained by dip molding the polychloroprene latex of the first embodiment or the polychloroprene latex composition of the second embodiment described above.

The method of producing the molded article of the present embodiment is not particularly limited, and the molded article may be dip-molded and vulcanized by common methods. Specifically, a molding mold carrying a coagulant coated thereon is dipped into the polychloroprene latex or the polychloroprene latex composition for solidification of the solid matter. The resulting rubber film is washed for removal of water-soluble impurities, dried, cured, and separated from the mold, to give a film-shaped dip-molded article.

The thickness of the dip-molded article in the present embodiment can be adjusted by modification of the period of the molding mold dipped in the polychloroprene latex or the rubber composition or by modification of the solid matter concentration in the polychloroprene latex or the rubber composition. Specifically for reduction of the thickness of the dip-molded article, the dipping period may be shortened or the solid matter concentration in the polychloroprene latex or the rubber composition reduced.

As described above in detail, the molded article of the present embodiment, which utilizes the polychloroprene latex of the first embodiment or the polychloroprene latex composition of the second embodiment described above, is superior in strength to conventional products.

EXAMPLES

Hereinafter, the advantageous effects of the present invention will be described specifically with reference to Examples and Comparative Examples of the present invention. It should be understood that the present invention is not restricted by these Examples. The polychloroprene latexes of Examples and Comparative Examples were prepared and the properties thereof evaluated by the methods shown below.

Example 1

<Preparation of Polychloroprene Latex>

100 parts by mass of water, 4.0 parts by mass of a disproportionated rosin acid, 1.3 parts by mass of potassium hydroxide, and 0.5 parts by mass of a formaldehyde sodium naphthalenesulfonate condensate as anionic emulsification assistant were placed and dissolved in a reactor having a capacity of 3 liter under nitrogen stream. Then, 90 parts by mass of chloroprene, 10 parts by mass of 2,3-dichloro-1,3-butadiene, and 0.03 parts by mass of n-dodecylmercaptan were added thereto, as the mixture was agitated.

The mixture was then polymerized, using potassium persulfate as initiator at 35° C. under a nitrogen environment, and the polymerization was terminated by addition of a phenothiazine suspension when the polymerization rate reached 85%. Polyoxyethylene cetyl ether (trade name: Emulgen 220, manufactured by Kao Corp.) was added as nonionic emulsifier to the polymerization solution in an amount of 0.6 parts by mass with respect to 100 parts by mass of the chloroprene polymer (0.5 parts by mass in polymerization solution) and unreacted monomers were removed under reduced pressure. The solution was then concentrated, as water was removed under reduced pressure, to give a polychloroprene latex having a solid matter concentration of 60 mass %.

<2,3-Dichloro1,3-Butadiene Content>

A polychloroprene latex was freeze-dried, and the 2,3-dichloro1,3-butadiene content therein was determined quantitatively, using a pyrolyzer manufactured by Japan Analytical Industry (JPS-330) and a gas chromatograph manufactured by Agilent Technologies (HP5890-II).

<Potassium and Sodium Ion Contents>

One g of a polychloroprene latex was decomposed with mixed acid of sulfuric and nitric acids. The potassium and sodium ion contents were determined quantitatively after the solution was made acidic with hydrochloric acid, using an inductively coupled plasma-atomic emission spectroscopic analyzer manufactured by SII Nanotechnology (ICP-AES: VISTA-PRO).

<Precipitation Rate>

Fifty g of a polychloroprene latex was placed and agitated at 400 rpm in a glass bottle having a capacity of 225 ml in a room kept at 23° C.

50 ml of saturated aqueous solution of calcium hydroxide at 23° C. was added dropwise thereto via a bullet over two minutes. The precipitate solution obtained after all of the saturated aqueous solution of calcium hydroxide at 23° C. was added was transferred entirely into a glass bottle and the glass bottle was left still for 16 hours, as it is sealed tightly.

The precipitate was filtered through a 80 mesh wire mesh and the filtration cake was cut to fine pieces with scissors, washed with water, and dried at 110° C. for 3 hours. The dry mass of the precipitate was determined and the precipitation rate was calculated according to Equation 2. The procedure was repeated twice and the average of the precipitation rates was determined.

<Film-Forming Efficiency>

Three parts by mass of zinc oxide (two kinds of zinc white, manufactured by Sakai Chemical Industry Co., Ltd.), 0.6 parts by mass of sulfur (manufactured by Tsurumi Chemical Co., Ltd.), 1.2 parts by mass of an antioxidant (Wingstay-L, manufactured by R. T. Vanderbilt Company, Inc.), 0.24 parts by mass of sodium laurylsulfate (EMAL 10G, manufactured by Kao Corp.), and 4.56 parts by mass of water were mixed in a ceramic ball mill at 20° C. for 16 hours, to give an aqueous dispersion.

One hundred parts by mass (wet) of the polychloroprene latex and 20.48 parts by mass of water were mixed with 9.6 parts by mass (wet) of the aqueous dispersion, to give a polychloroprene latex composition for dip molding having a solid matter concentration of 50%. Separately, a coagulant solution containing 15.4 mass % of calcium nitrate, 7.7 mass % of calcium carbonate, and 76.9 mass % of water was prepared.

A ceramic tube was dipped for 10 seconds in the coagulant solution agitated mechanically and the resulting tube was dried at 50° C. for 2 minutes. The tube carrying the coagulant precipitated on the surface was then dipped into the polychloroprene latex composition for 20 seconds and then withdrawn therefrom slowly. The tube carrying the coagulated polychloroprene latex was washed with tap water for 1 minute, dried at 50° C. for 5 minutes and heated additionally at 140° C. for 30 minutes, to give a cured film. The cured film obtained was observed under scanning electron microscope and a film having a uniform cross section was indicated by ○ and a film having an uneven cross section by ×.

<Fraction Defective During Glove Production>

Ten thousand gloves were prepared in a manner similar to that above, except that the ceramic tube used in evaluation of film-forming efficiency was replaced with a hand-shaped ceramic mold. In evaluation, a fraction defective, as determined when 1000 samples were tested, of less than 1.5% was indicated by ⊚, that of 1.5% or more and less than 2.0% by ○, and that of more than 2.0% by ×.

<Anti-Freezing Stability>

A polychloroprene latex (solid matter concentration: 60%) was left in a glass test tube at −3° C. for 24 hours, while the solution was agitated with a glass rod at an interval of 2 hours, and it was then determined whether the solution was frozen. As a result, a polychloroprene latex without any change in appearance was indicated by ⊚; that with increased viscosity but practically without any problem by ○; and that practically unusable by increased viscosity or freezing by ×.

Examples 2 to 14 and Comparative Examples 1 to 4

Polychloroprene latexes and film samples were prepared respectively in the compositions shown in the following Tables 1 and 2 by a method similar to that described in Example 1 and evaluated similarly to Example 1.

The evaluation results are summarized in the following Tables 1 and 2.

TABLE 1

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Components | Disproportionated rosin acid (parts by mass) | 4.0 | 4.0 | 4.0 | 4.0 | 4.0 | 4.0 | 4.0 | 4.0 | 2.5 | 5.5 | 4.0 | 4.0 | 4.0 | 4.0 |
| | Nonionic emulsifier (parts by mass) | 0.4 | 0.2 | 0.0 | 0.5 | 0.0 | 0.4 | 0.4 | 0.4 | 0.4 | 0.4 | 0.8 | 0.4 | 0.4 | 0.4 |
| | Anionic emulsifier (parts by mass) | 0.5 | 0.4 | 0.4 | 1.0 | 1.0 | 0.0 | 1.0 | 0.5 | 0.5 | 0.5 | 0.5 | 1.5 | 0.5 | 0.5 |
| Composition | 2,3-Dichloro-1,3-butadiene copolymerization rate (mass %) | 10 | 11 | 9 | 0 | 0 | 11 | 11 | 35 | 10 | 10 | 10 | 10 | 10 | 10 |
| | Potassium ion content (parts by mass) | 0.6 | 0.8 | 0.9 | 0.6 | 0.6 | 0.8 | 0.1 | 0.6 | 0.6 | 0.6 | 0.6 | 0.6 | 1.5 | 0.6 |
| | Sodium ion content (parts by mass) | 0.2 | 0.2 | 0.2 | 0.3 | 0.1 | 0.1 | 0.9 | 0.2 | 0.2 | 0.2 | 0.2 | 0.2 | 0.2 | 0.5 |
| Evaluation | Precipitation rate (%) | 6 | 8 | 13 | 13 | 40 | 10 | 6 | 6 | 6 | 6 | 6 | 6 | 6 | 6 |
| | Film-forming efficiency | ⊚ | ⊚ | ⊚ | ⊚ | ⊚ | ⊚ | ⊚ | ⊚ | ○ | ⊚ | ⊚ | ⊚ | ⊚ | ⊚ |
| | Fraction defective during glove production | ⊚ | ⊚ | ⊚ | ⊚ | ⊚ | ⊚ | ⊚ | ⊚ | ⊚ | ○ | ○ | ○ | ⊚ | ⊚ |
| | Anti-freezing stability | ⊚ | ⊚ | ⊚ | ⊚ | ○ | ○ | ○ | ⊚ | ⊚ | ⊚ | ⊚ | ⊚ | ○ | ○ |

TABLE 2

| | | Comparative Example | | | |
|---|---|---|---|---|---|
| | | 1 | 2 | 3 | 4 |
| Components | Disproportionated rosin acid (parts by mass) | 4.0 | 4.0 | 4.0 | 0.4 |
| | Nonionic emulsifier (parts by mass) | 1.5 | 1.0 | 0.8 | 0.5 |
| | Anionic emulsifier (parts by mass) | 0.8 | 0.8 | 0.6 | 10 |
| Composition | 2,3-Dichloro-1,3-butadiene copolymerization rate (mass %) | 11 | 11 | 11 | 0.6 |
| | Potassium ion content (parts by mass) | 0.8 | 0.8 | 0.8 | 0.2 |
| | Sodium ion content (parts by mass) | 0.2 | 0.2 | 0.2 | 0.2 |
| Evaluation | Precipitation rate (%) | 0.1 | 1 | 4 | 45 |
| | Film-forming efficiency | × | × | × | unmoldable |
| | Fraction defective during glove production | × | × | × | unmoldable |
| | Anti-freezing stability | ○ | ○ | ○ | × |

As shown in Table 2, the polychloroprene latexes of Comparative Examples 1 to 3, which had a precipitation rate of lower than 5%, were lower in film-forming efficiency and gave a higher fraction defective during glove production. On the other hand, the polychloroprene latex of Comparative Example 4, which had a precipitation rate of more than 40%, showed lower anti-freezing stability. In addition, the polychloroprene latex of Comparative Example 4 gave no smooth film, as the film thickness was uneven and the surface roughened (not dip-moldable).

In contrast, the polychloroprene latexes of Examples 1 to 14 shown in Table 1 showed favorable results in all tested properties. The results above demonstrate that it is possible according to the present invention to obtain a polychloroprene latex superior in rubber coagulability and to produce a film superior in strength by dip molding.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A polychloroprene latex obtained by polymerization of 2-chloro-1,3-butadiene alone or by polymerization of raw monomers at least containing 2-chloro-1,3-butadiene and 2,3-dichloro1,3-butadiene,
having a precipitation rate of 5 to 40%, as determined by adjusting the polychloroprene latex to a solid matter concentration of 45 to 65 mass % at a liquid temperature of 23° C., precipitating the homopolymer or the copolymer in the adjusted polychloroprene latex by coagulation, as 50 ml of saturated aqueous solution of calcium hydroxide at 23° C. is added dropwise to 50 g of the adjusted polychloroprene latex over 2 minutes, collecting the precipitate as filter cake by filtering the polychloroprene latex containing the precipitate through a 80 mesh wire mesh, determining the mass of the dry product obtained by drying the collected precipitate at 110° C. for 3 hours as A (g), the mass of the polychloroprene latex before addition of calcium hydroxide as B (g), and the solid matter concentration of the polychloroprene latex before dropwise addition of calcium hydroxide as C (mass %), and calculating it according to the following equation (I):

$$\text{Precipitation rate}(\%) = \frac{A}{B \times \frac{C}{100}} \times 100 \qquad (I)$$

wherein, the polychloroprene latex comprises;
a rosin acid and its alkali-metal salts in a total amount of 3.0 to 5.0 parts by mass, and
an anionic emulsification assistant (excluding rosin acid-derived products) in an amount of 0.1 to 1.0 part by mass in 100 parts by mass of the solid matter.

2. The polychloroprene latex according to claim 1, wherein the content of 2,3-dichloro-1,3-butadiene in the raw monomers is 1 to 30 mass %.

3. The polychloroprene latex according to claim 1, comprising a nonionic emulsifier in an amount of 0.7 parts or less by mass in 100 parts by mass of the solid matter.

4. The polychloroprene latex according to claim 1, comprising
potassium ions in an amount of 0.5 to 1.5 parts by mass and sodium ions in an amount of 0.1 to 0.4 parts by mass
in 100 parts by mass of the solid matter.

5. A polychloroprene latex composition, comprising
the polychloroprene latex according to claim 1 as solid matter in an amount of 100 parts by mass,
a metal oxide in an amount of 1 to 10 parts by mass,
an antioxidant in an amount of 0.1 to 5 parts by mass, and
a surfactant in an amount of 0.1 to 10 parts by mass.

6. The polychloroprene latex composition according to claim 5, further comprising sulfur in an amount of 0.1 to 3 parts by mass.

7. A molded article prepared by dip-molding the polychloroprene latex according to claim 1.

8. A molded article prepared by dip-molding the polychloroprene latex composition according to claim 5.

9. A polychloroprene latex obtained by polymerization of 2-chloro-1,3-butadiene alone or by polymerization of raw monomers at least containing 2-chloro-1,3-butadiene and 2,3-dichloro1,3-butadiene,
having a precipitation rate of 5 to 40%, as determined by adjusting the polychloroprene latex to a solid matter concentration of 45 to 65 mass % at a liquid temperature of 23° C., precipitating the homopolymer or the copolymer in the adjusted polychloroprene latex by coagulation, as 50 ml of saturated aqueous solution of calcium hydroxide at 23° C. is added dropwise to 50 g of the adjusted polychloroprene latex over 2 minutes, collecting the precipitate as filter cake by filtering the polychloroprene latex containing the precipitate through a 80 mesh wire mesh, determining the mass of the dry product obtained by drying the collected precipitate at 110° C. for 3 hours as A (g), the mass of the polychloroprene latex before addition of calcium hydroxide as B (g), and the solid matter concentration of the polychloroprene latex before dropwise addition of calcium hydroxide as C (mass %), and calculating it according to the following equation (I):

$$\text{Precipitation rate}(\%) = \frac{A}{B \times \frac{C}{100}} \times 100 \qquad (I)$$

wherein the polychloroprene latex comprises,
potassium ions in an amount of 0.5 to 1.5 parts by mass and sodium ions in an amount of 0.1 to 0.4 parts by mass
in 100 parts by mass of the solid matter.

10. The polychloroprene latex according to claim 9, wherein the content of 2,3-dichloro-1,3-butadiene in the raw monomers is 1 to 30 mass %.

11. The polychloroprene latex according to claim 9, comprising a nonionic emulsifier in an amount of 0.7 parts or less by mass in 100 parts by mass of the solid matter.

12. A polychloroprene latex composition, comprising the polychloroprene latex according to claim 9 as solid matter in an amount of 100 parts by mass,
a metal oxide in an amount of 1 to 10 parts by mass,
an antioxidant in an amount of 0.1 to 5 parts by mass, and
a surfactant in an amount of 0.1 to 10 parts by mass.

13. The polychloroprene latex composition according to claim 12, further comprising sulfur in an amount of 0.1 to 3 parts by mass.

14. A molded article prepared by dip-molding the polychloroprene latex according to claim 9.

15. A molded article prepared by dip-molding the polychloroprene latex composition according to claim 12.

16. A polychloroprene latex composition, comprising
the polychloroprene latex as solid matter in an amount of 100 parts by mass,
a metal oxide in an amount of 1 to 10 parts by mass,
an antioxidant in an amount of 0.1 to 5 parts by mass, and
a surfactant in an amount of 0.1 to 10 parts by mass,
wherein the polychloroprene latex obtained by polymerization of 2-chloro-1,3-butadiene alone or by polymerization of raw monomers at least containing 2-chloro-1,3-butadiene and 2,3-dichloro 1,3-butadiene, having a precipitation rate of 5 to 40%, as determined by adjusting the polychloroprene latex to a solid matter concentration of 45 to 65 mass % at a liquid temperature of 23° C., precipitating the homopolymer or the copolymer in the adjusted polychloroprene latex by coagulation, as 50 ml of saturated aqueous solution of calcium hydroxide at 23° C. is added dropwise to 50 g of the adjusted polychloroprene latex over 2 minutes, collecting the precipitate as filter cake by filtering the polychloroprene latex containing the precipitate through a 80 mesh wire mesh, determining the mass of the dry product obtained by drying the collected precipitate at 110° C. for 3 hours as A (g), the mass of the polychloroprene latex before addition of calcium hydroxide as B (g), and the solid matter concentration of the polychloroprene latex before dropwise addition of calcium hydroxide as C (mass %), and calculating it according to the following equation (I):

$$\text{Precipitation rate (\%)} = \frac{A}{B \times \frac{C}{100}} \times 100. \tag{I}$$

17. The polychloroprene latex composition according to claim 16, further comprising sulfur in an amount of 0.1 to 3 parts by mass.

18. A molded article prepared by dip-molding the polychloroprene latex composition according to claim 16.

* * * * *